SUPERCONDUCTOR GATING CIRCUITS

Filed Dec. 27, 1957 5 Sheets-Sheet 1

INVENTORS
ANDREW E. BRENNEMANN
HOWARD L. FUNK

BY John E. Dougherty Jr.

ATTORNEY

3,007,057
SUPERCONDUCTOR GATING CIRCUITS

Andrew E. Brennemann and Howard L. Funk, Poughkeepsie, N.Y., assignors to International Business Machines Corporation, New York, N.Y., a corporation of New York Filed Dec. 27, 1957, Ser. No. 705,598
20 Claims. (Cl. 307—88.5)

The present invention relates to superconductor devices and, more particularly, to magnetic switches and gating circuits using such switches wherein bodies of superconductor material are employed as magnetic shields for controlling the transmission of signals.

The term superconductor has been applied to those materials which, when cooled below particular characteristic temperatures in the vicinity of absolute zero, undergo transitions whereby they become essentially perfect conductors or, differently stated, they lose all measurable electrical resistance. The term superconductivity is, of course, descriptive of this property, but there are other properties of these materials which also change remarkably when the materials are cooled below their particular transition temperatures. One such property is the magnetic permeability of these materials, which, when the materials are in a superconductive state, is essentially zero and the materials become, therefore, essentially perfect magnetic shields. This shielding property may be attributed to the fact that, when magnetic fields within certain limits are applied either to impinge upon a superconductive body or to tend to change the net flux threading a closed loop of superconductor material, currents are induced in the material which currents, since the material is essentially a perfect conductor, are capable of producing fields which are equal and opposite to the applied field. These equal and opposite fields prevent an applied field from either penetrating a body of superconductive material or changing the net flux threading a closed loop of superconductive material.

The temperature which is usually termed the transition temperature for superconductive materials is the temperature at which they become superconductive in the absence of a magnetic field. The actual temperature at which the transition to a superconductive state occurs may be lowered by applying a magnetic field to the material. Further, a superconductor material, which is maintained at a temperature below its transition temperature and is in a superconductive state, may be driven back to a normal or resistive state by causing the material to be subjected to a magnetic field of sufficient intensity. Thus, a body of superconductor material maintained at a temperature below its transition temperature may be used to control the magnetic coupling between a pair of conductors and, therefore, the transmission of signals between these conductors. This superconductor body is interposed between the two conductors in order to satisfy the requirements of shielding as set forth above. When the material is superconductive, it serves as a magnetic shield for preventing input signals applied to one of these conductors from being effective to induce output signals in the other conductor. This shielding property may be destroyed by causing the material to be subjected to a field of sufficient intensity to quench superconductivity in the material, thereby allowing signals to be transmitted between the conductors. An example of circuitry of this type is found in copending application Serial No. 687,225 filed September 30, 1957, now Patent 2,914,735 in behalf of D. R. Young and assigned to the assignee of this application.

A prime object of the present invention is to provide an improved magnetic switch.

A further object is to provide improved modulating and/or gating circuits which employ bodies of superconductive material as controllable magnetic shields.

Still another object is to provide a gating circuit comprising a cylindrical body of superconductor material as a magnetic shield between input and output coil conductors, one of which is arranged within the cylinder and the other of which is arranged to embrace the cylinder.

A further object is to provide multiple function gating devices which employ a plurality of individual layers of superconductive material which can be selectively driven between superconductive and normal states to serve as controllable magnetic shields between input and output conductors for the circuit.

Still another object is to provide circuits of the above described type employing one or more cylindrical shields of superconductive material wherein the shield or shields are selectively driven resistive by causing a current to flow longitudinally along the cylinders.

Still another object is to provide superconductor gating circuits wherein the transmission of signals between input and output conductors is modulated by control signals which are ineffective to induce signals in the input and output conductors.

A further object is to provide superconductive gating circuits comprising input and output coils separated by at least one cylindrical layer of superconductive material arranged concentrically with said coils wherein each of said cylinders is individually effective to serve as a magnetic shield between the coils it separates and wherein each of said layers may be individually driven from a superconductive to a normal state.

A feature of the invention lies in the provision of magnetic gating circuits employing superconductor shields which are operable in accordance with the AND logical function.

Another object of the invention is to provide switches and circuits as described in the above objects wherein the superconductivity of the shield or shields is quenched by current from current sources connected through appropriate switching devices directly to the shields.

Other objects of the invention will be pointed out in the following description and claims and illustrated in the accompanying drawings, which disclose, by way of example, the principle of the invention and the best mode, which has been contemplated, of applying the principle.

Figure 5:
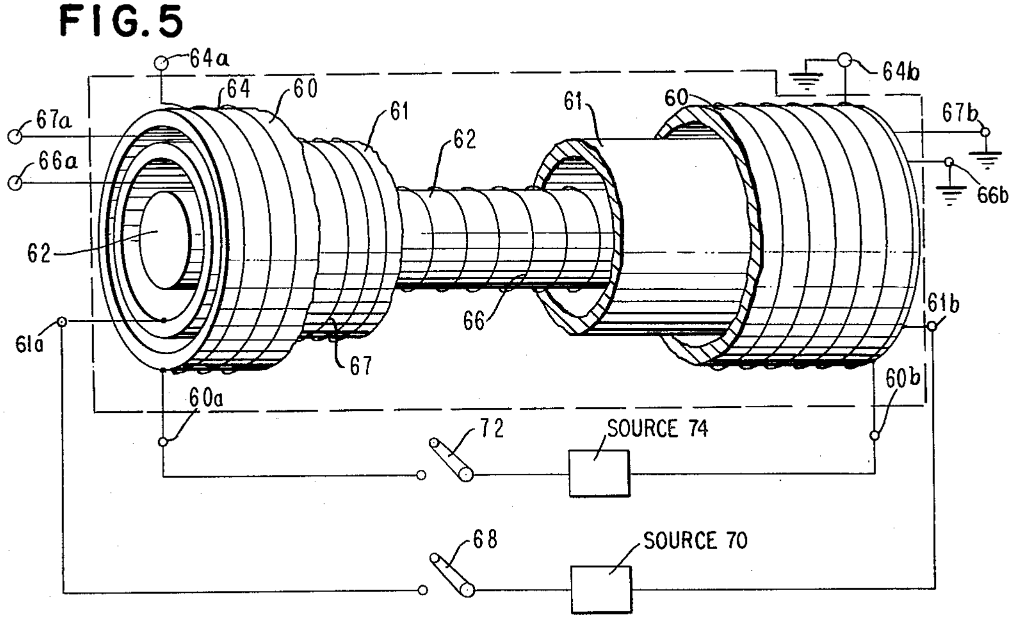
FIG. 5 is a diagrammatic showing of a magnetic switch comprising two superconductive cylinders and three coils which may be operated to perform a number of switching functions.
Figure 6:
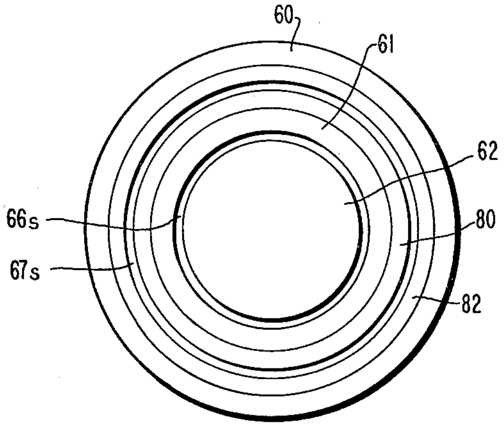
FIG. 6 is a cross sectional view illustrating in more detail the manner in which the switch of FIG. 5 might be constructed.
Figure 6A:
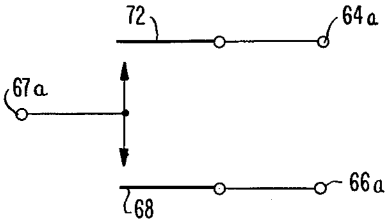
Figure 6B:
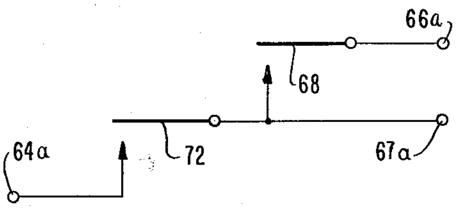
Figure 6C:
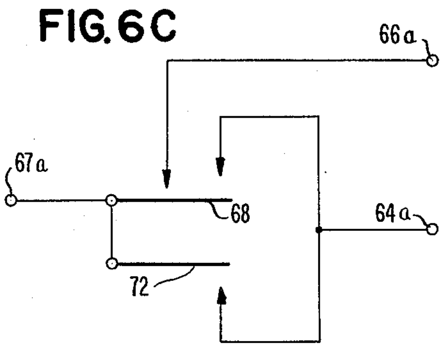

FIGS. 6A, 6B, and 6C are electrical circuit diagrams which illustrate some of the switching functions which may be performed with a switch of the type shown in FIG. 5.

Figures 2, 2A:
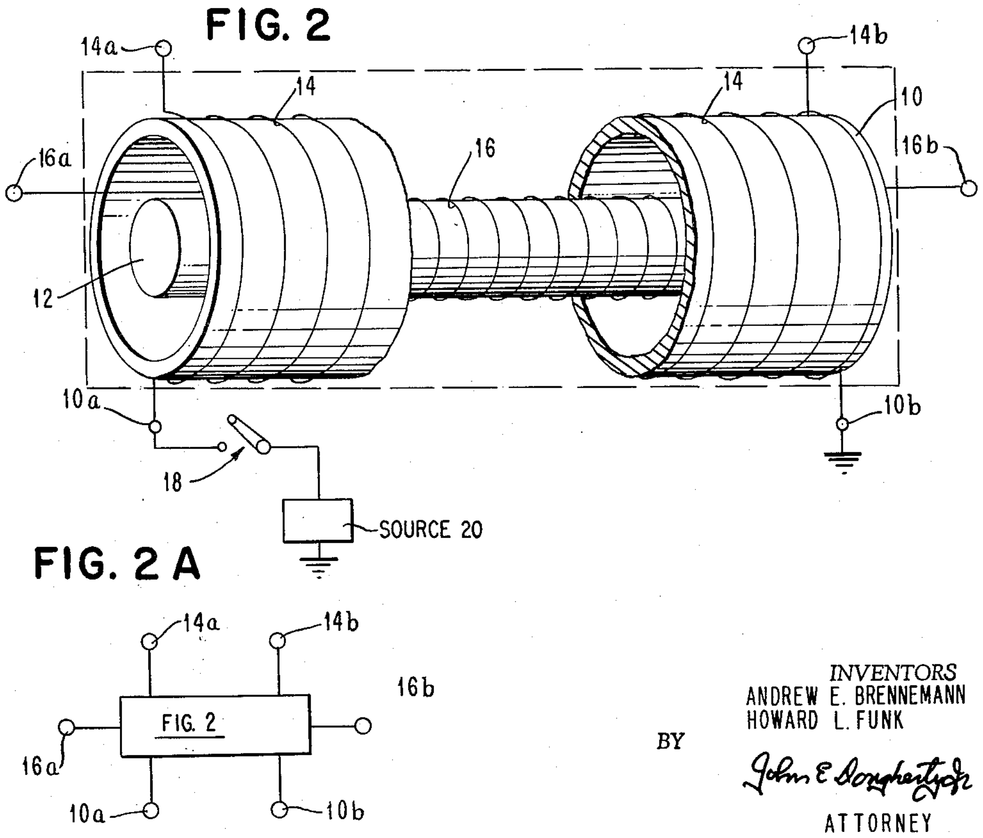
FIG. 2 is a diagrammatic showing of one embodiment of a single-input, single-output magnetic switch built in accordance with the principles of the invention.
FIG. 2A is a block diagram representation of the switch of FIG. 2.
Figures 3, 3A:
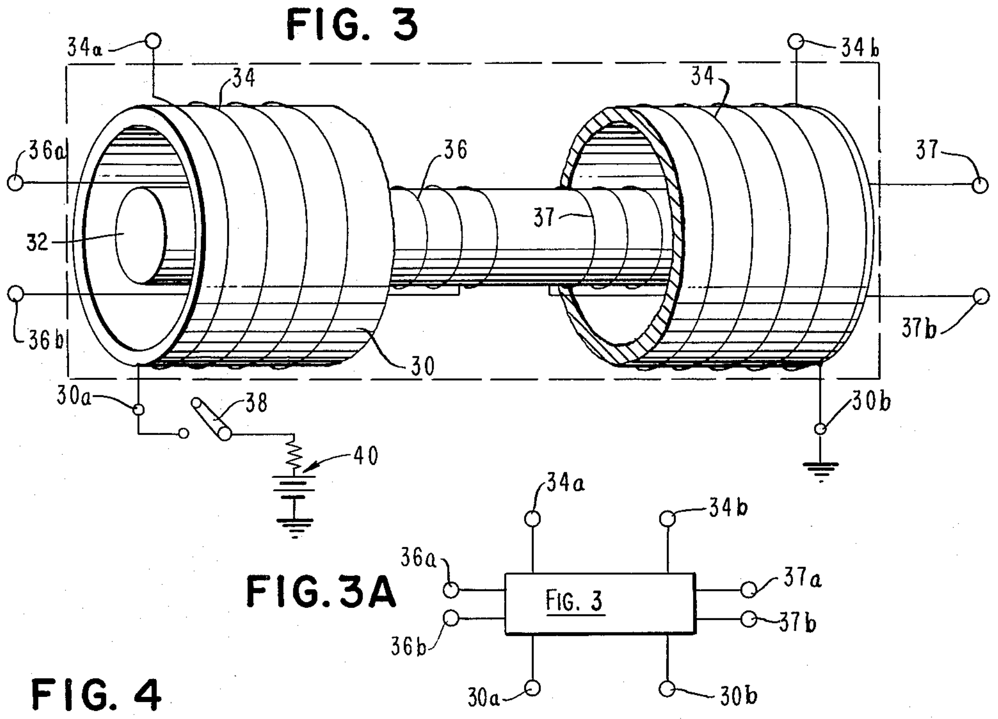
FIG. 3 is a diagrammatic showing of an embodiment of a single-input, multiple-output magnetic switch constructed in accordance with the principles of the invention.
FIG. 3A is a block diagram representation of the switch of FIG. 3.
Figure 7:
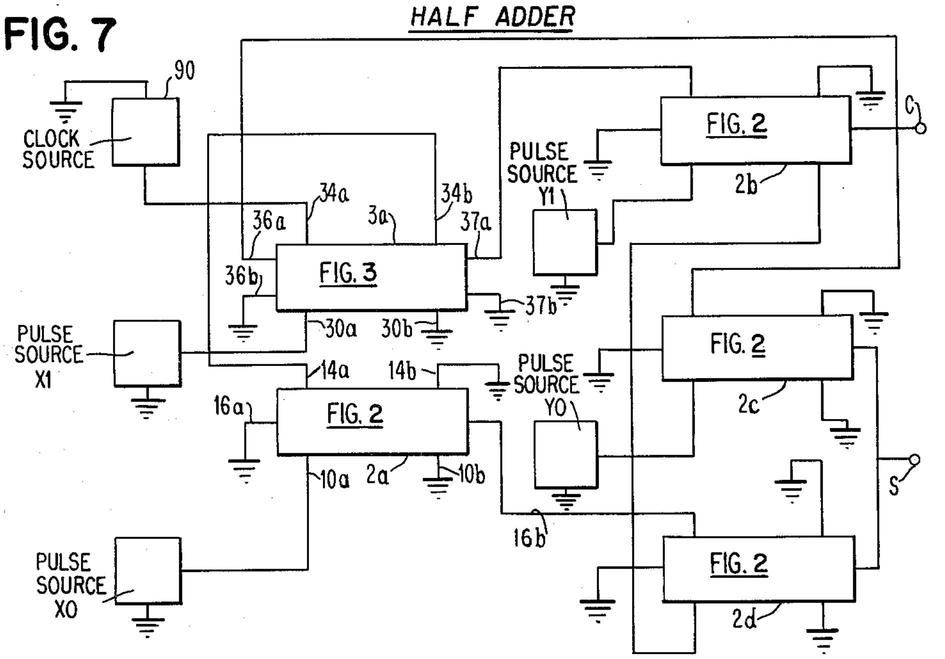

FIG. 7 is a schematic circuit diagram of a binary half adder which employs the switches of FIGS. 2 and 3.

Figure 8:
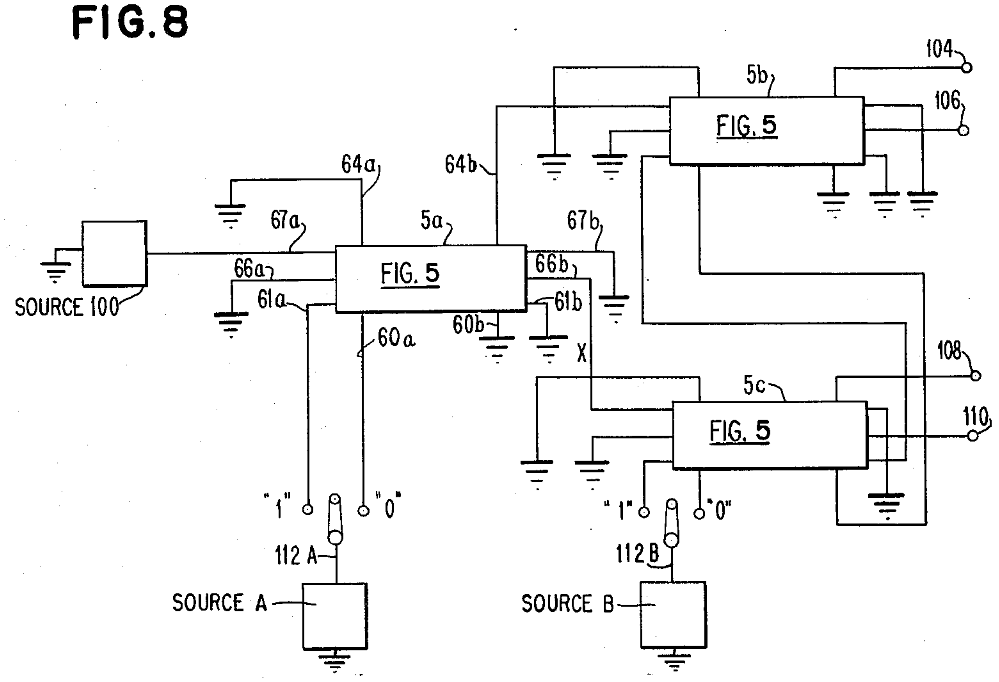

FIG. 8 is a schematic circuit diagram of a matrix switching circuit wherein the magnetic switch of FIG. 5 is used.

Figure 1:
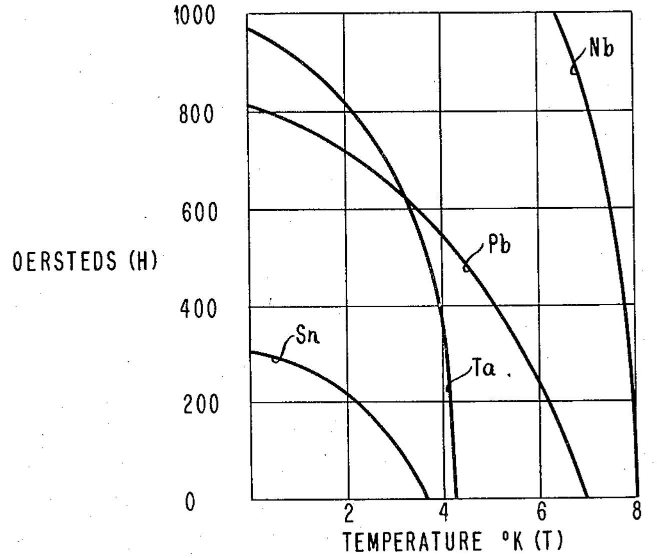
FIG. 1 is a plot of magnetic field versus temperature which depicts the superconductive transition characteristics for a number of superconductor materials.

Referring now to FIG. 1, the plot there shown depicts the transition temperature (T) for a number of materials in the presence of different intensities of magnetic field (H). For example, in the absence of a magnetic field, tantalum (Ta) undergoes a transition from a normal to a resistive state at approximately 4.4° K., tin (Sn) at approximately 3.72° K., lead (Pb) at approximately 7.2° K. and niobium (Nb) at approximately 8.0° K. These transition temperatures are lowered as magnetic fields of increasing intensity are applied to the materials. The state of the various materials, superconductive or normal, for different temperature-field conditions is ascertained by whether the particular condition is to the left or right of the curve for the material; for temperature-field conditions to the left of the curve, the material is superconductive and, for those to the right of the curve, the material is in a resistive or normal state. The transition curve for any sample may vary somewhat according to the purity of the sample used and the manner in which it is prepared. For example, considering tantalum maintained at a temperature of 4.2° K., which is a convenient temperature since it is the temperature at which liquid helium boils at atmospheric pressure, the material remains in a superconductive state as long as the intensity of magnetic field to which it is subjected is below a transition field which may vary for different samples from about 50 to 100 oersteds. The field which is required to cause a material to undergo a transition from a superconductive to a normal state at a particular temperature is termed the critical field ($Hc$) for that material at that temperature. Thus, tantalum may be prepared to have a critical field ($Hc$) of 50 oersteds at 4.2° K. At this temperature, the critical field for niobium (Nb) is in excess of 1000 oersteds; for lead (Pb) is in excess of 400 oersteds; and tin (Sn) is, as indicated, in a normal or resistive state at 4.2° K., even in the absence of a magnetic field. At an operating temperature of 3.6° K. which is slightly below the transition temperature for tin in the absence of a magnetic field, the critical fields for tantalum, lead, and niobium are all in excess of 300 oersteds, whereas the critical field for tin is less than 100 oersteds. For more detailed information on the theory of superconductivity, various superconductor materials, and means for attaining temperatures in the vicinity of absolute zero, reference may be made to work of D. Shoenberg entitled "Superconductivity," the second edition of which was published in 1952 by the Syndics of the Cambridge University Press; and to an article by Dudley Buck which appeared at pages 482–493 of the April 1956, issue of the Proceedings of the IRE.

FIG. 2 is a diagrammatic representation of a magnetic switching or gating circuit constructed in accordance with the principles of the invention. The gating element comprises a hollow cylinder 10 within which there is arranged a cylindrical rod or core 12. The cylinder 10 is made of a superconductor material which is maintained at a temperature below that at which the material becomes superconductive in the absence of a magnetic field.

The circuit is provided with an outer coil 14, which is wound around the cylinder 10, and an inner coil 16 which is wound around the core 12 within the cylinder. The function of the circuit is to gate or modulate the transmission of signals between these coils. Both of the coils may be made of a superconductive material. For example, if a tantalum cylinder is used, the coils may be made of niobium which, as is indicated in FIG. 1, is capable of remaining in a superconductive state at the operating temperature when subjected to magnetic fields of sufficient intensity to cause a tantalum cylinder to be driven into a resistive state. Other combinations of material might be utilized. For example, the cylinder 10 may be tin and the coils 14 and 16 may be made of lead wire, in which case the operating temperature would be below 3.72° K., the temperature at which tin becomes superconductive in the absence of a magnetic field. Further, the coils 14 and 16 need not be made of superconductor material; both may be wound with copper wire which is not superconductive or one may be a superconductor and the other a nonsuperconductor. Thus, in the illustrative embodiment of FIG. 2, the coils 14 and 16 may be both niobium, or both copper, or the outer coil 14 may be wound with niobium wire and the inner coil 16 with copper wire. It should also be noted that in this and the other embodiments, wire wound coils need not be used but instead the coils may be made using printed circuit type techniques. For example, the coils may be made by depositing the desired metal or metals in the proper configuration on the cylinder 10 and rod 12, or the outer coil 14 may be deposited on the outer surface of cylinder 10 and the inner coil 16 on the inner surface of the cylinder. Where wire wound coils are used, proper insulation may be provided on the coils themselves, whereas, when the coil conductors are deposited, layers of an insulating material such as silicon monoxide are also deposited to provide the necessary insulation. The function of the circuit, which, as above stated, is to gate or modulate the transmission of signals between these coils, is accomplished by selectively driving the cylinder 10 between superconductive and resistive states to thereby control the magnetic coupling between the coils. The core 12 within cylinder 10 may be made of a dielectric material having good insulating properties or, in order to improve coupling between the coils 14 and 16 when cylinder 10 is in a normal or resistive state, a rod or core of magnetic material, which has a relatively high permeability at the operating temperature, may be used.

When the cylinder 10 is in a superconductive state, it serves as a magnetic shield which prevents magnetic coupling between coils 14 and 16. Thus, when, for example, with cylinder 10 in a superconductive state, an input signal is applied at a pair of terminals **14*a* and 14*b* for outer coil 14 to cause current flow in this coil, the cylinder prevents any signal from being induced in the inner coil 16 and no output signal is produced between terminals 16*a* and 16*b* of this coil. When the input signal is applied to coil 14, a longitudinal magnetic field is established within the coil which attempts to penetrate the tin cylinder. However, in accordance with one of the characteristics of the superconductor state, the cylinder allows the applied field to penetrate only to a very limited depth, which is usually termed the penetration depth, and which, for example, for tantalum at 4.2° K. is in the order of 1000 Angstroms. The material is capable of resisting penetration by the applied magnetic field as long as the applied field is less than the critical field for the material at the operating temperature. For this reason, the input current signals applied to coil 14 are always less than that necessary to render the coil effective to apply to cylinder 10 a field in excess of its critical field $Hc$. When the input signal is applied to coil 14, the resulting longitudinal field also passes within the cylinder 10. However, the cylinder may be viewed as a series of connected circular rings, each of which forms a circular closed circuit or loop at right angles to the axis of the cylinder. The longitudinal field produced by energizing coil 14 threads each of these closed loops thereby inducing currents therein which produces a magnetic field equal and opposite to that produced by coil 14. As long as the currents induced in the cylinder 10 are less than the current which prdouces a net field in excess of the critical field Hc for the superconductor material, these induced currents prevent any net change in the flux threading the cylinder and thereby prevent any output signal from being induced in coil 16 when an input current signal is applied to coil 14**.

The gating circuit may be opened to allow magnetic coupling to be established between coils 14 and 16 by causing the cylinder 10 to be driven from a superconductive to a normal state. This is accomplished by causing current to flow through the cylinder between a pair of terminals 10*a* and 10*b* connected at either end of the cylinder. The current is supplied by a source represented schematically in the circuit diagram by block 20 and the application of the current is controlled by a switching device schematically represented as a mechanically operated switch 18. When this switch is closed, current from the source 20 flows longitudinally in the cylinder, thereby producing a circular magnetic field on the outside of the cylinder which is oriented at right angles to the axis of the cylinder. The current applied by source 20 to cylinder 10 is sufficiently large to cause the material of which the cylinder is fabricated to undergo a transition from the superconductive to the normal state. The cylinder 10 remains in a normal state as long as the current from source 20 is flowing therethrough and the gating circuit is then open to allow magnetic coupling to be established between coils 14 and 16 so that the application of an input signal between terminals 14*a* and 14*b* will cause an output signal to be induced on winding 16 and manifested at terminals 16*a*, 16*b*.

Persistent currents may be established in the cylinder 10 if the cylinder is allowed to reassume a superconductive state at a time when there is a net flux threading the cylinder. Thus, if for example, a switch 18 is opened to allow the cylinder to reassume a superconductive state at a time when coil 14 is carrying current and thereby producing a longitudinal field within the cylinder, and, then, the signal current in this coil is terminated, a persistent current will be established in the cylinder. Persistent currents of this type are, of course, employed to advantage in many circuit applications but can have deleterious effects in others. The establishing of persistent currents in the circuit of FIG. 2 can be avoided by always terminating the control or gating signal supplied by source 20 under control of switch 18 at a time when neither of the coils 14 or 16 is carrying current.

Certain advantageous features of the magnetic gating device of FIG. 2 should be here noted. First, since the superconductive shield is here in the form of a cylinder which is controlled between superconductive and normal states by gating signals which cause current to flow longitudinally along the cylinder, the gating signals do not produce any magnetic field within the cylinder and, therefore, the gating signals cannot produce any outputs in coil 16. However, even if such was not the case, since the field produced by the gating currents flowing along the cylinders is oriented at right angles to the axis of this coil as well as that of the outer coil 14, the gating currents are ineffective to induce spurious signals in either of these coils and, conversely, currents in the coils 14 and 16 are ineffective to induce currents between terminals 10*a* and 10*b* in the gating circuit.

FIG. 3 is a diagrammatic showing of another embodiment of the invention. The switching device shown in this figure is very similar to that shown in FIG. 2 and comprises a cylinder 30 about which is wound an outer coil 34 coupled to a pair of terminals 34*a*, 34*b*, to which input signals to the circuit may be applied. The cylinder 30 is provided with connections to a pair of terminals 30*a* and 30*b*. These terminals are connected so that current from a source 40, here represented by a battery and resistor, flows longitudinally along the cylinder when a switch 38 is closed. The circuit of FIG. 3 is provided with a core or rod 32 which may be made either of a dielectric insulating material or of a material having a high magnetic permeability. A first inner coil 36 is wound around one end of core 32 and a second inner coil 37 is wound around the other end of this core. Coil 36 is provided with a pair of terminals 36*a* and 36*b* which are located at the left of the cylinder and coil 37 with a pair of terminals 37*a* and 37*b* which are located at the right of the cylinder. The operation of the circuit is essentially the same as that of FIG. 2 with the exception that in the embodiment of FIG. 3, two separate and distinct outputs are realized. When cylinder 30 is in a superconductive state, the input coil 34 and output coils 36 and 37 are effectively shielded. However, when switch 38 is operated to cause a gating signal to be applied to cylinder 30, thereby driving the cylinder resistive, signals may be transmitted from coil 34 to both of the output coils 36 and 37. Thus, when the gating circuit is opened to allow the transmission of signals therethrough, the application of an input to coil 34 is effective to produce outputs in both of the output coils 36 and 37. These output coils may be wound together along the entire length of rod 32 in the same manner as coil 16 in the embodiment of FIG. 2 with each having one of its terminals at each end of the cylinder.

Figure 4:
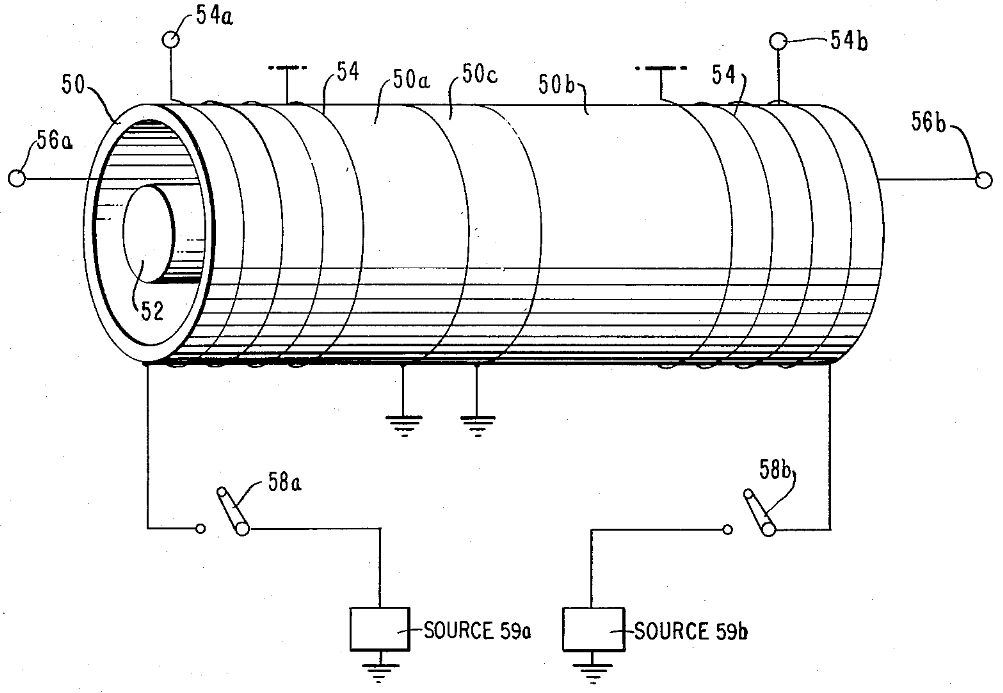
FIGS. 4 and 4A are diagrammatic showings of magnetic switches operable as AND gates.

A further embodiment of a magnetic switch constructed in accordance with the principles of the invention is shown in FIG. 4. The function of the circuit is, as in the above embodiments, to control the transmission of signals between an outer coil 54 wound around a cylinder 50 and an inner coil (not shown) wound around a magnetic core 52 and connected between terminals 56*a* and 56*b*. In this embodiment, the cylinder 50 consists of two sections 50*a* and 50*b* of superconductor material which are separated by a section 50*c* of nonsuperconductor material. The gating inputs are applied under control of a pair of switches 58*a* and 58*b* by a pair of sources 59*a* and 59*b*. Both of the cylinder sections 50*a* and 50*b* are normally superconductive so that the inner coil is shielded from coil 54. When switch 58*a* is operated, sufficient current is caused to flow along cylinder section 50*a* to drive this section into a resistive state and, likewise, when switch 58*b* is operated, section 50*b* is driven resistive. When both switches are operated and both of the sections 50*a* and 50*b* are in a resistive state, the application of a signal to coil 54 causes an output signal to be induced in the inner coil connected between terminals 56*a* and 56*b*. However, when only one of the switches is operated so that one of the sections, for example, the left section 50*a*, is in a normal state, and the other section remains superconductive, the superconductive section is effective, by its magnetic shielding action to prevent any appreciable magnetic coupling between the coils. Thus, unless both of the switches 58*a* and 58*b* are coincidently operated, the inner coil wound on core 52 is effectively shielded from coil 54 and the circuit thus functions as an AND gate. To improve the signal to noise ratio of circuits of this type, the core 52 may be extended to provide a closed magnetic path.

Figure 4A:
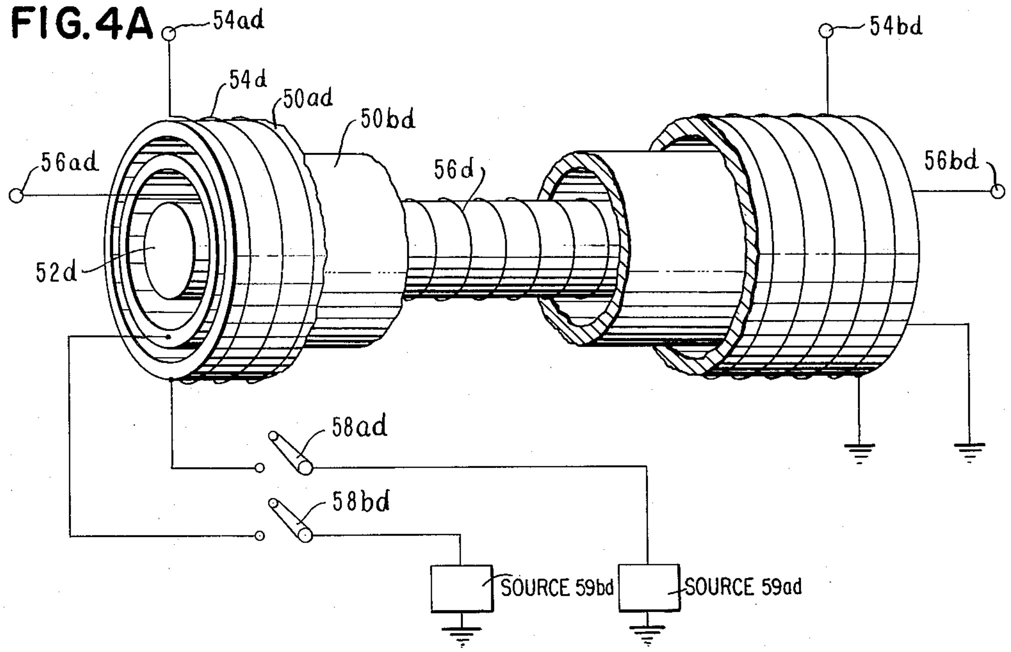

FIG. 4A shows another embodiment of the invention capable of being operated as an AND gate and because of the similarity between the structures FIGS. 4 and 4A, similar designations are used in both figures to identify like functional elements with the letter "*d*" being appended to the designation in FIG. 4A. In the embodiment of FIG. 4A the transmission of signals between an outer input coil 54*d* and an inner output coil 56*d* is controlled by controlling the state, superconductive or normal, of two concentric cylinders 50*ad* and 50 *bd*. Current signals for driving the inner one of these cylinders 50*bd* into a normal state are supplied by a source 59*bd* under control of a switch 58*bd* and signals are applied to the outer cylinder 50*ad* by a source 59*ad* under control of a switch 58*ad*. The outer coil 54*d* to which the input signals for the circuit are applied is wound on outer cylinder 50*ad* and the inner coil 56*d* in which output signals are induced is wound on a rod 52*d* which is arranged within both of the concentric cylinders. Since the longitudinal magnetic fields produced when coil 54*d* is energized link coil 56*d* and both of the cylinders, that is considering the cylinders as closed circular loops, there can be no coupling between the outer and inner coils unless both of the cylinders are in a resistive state. Therefore, if either or both of the switches 58*ad* and 58*bd* are open and one or both of the shielding cylinders are superconductive, the AND gate of FIG. 4A is closed to prevent transmission of signals between the inner and outer coils 54*d* and 56*d*.

In the embodiment of FIG. 4A, both of the cylinders 50*ad* and 50*bd* may be made of the same superconductor material. However, when this type of arrangement is employed, current flow along the inner cylinder 50*bd* produces a field which is applied to the inner surface of outer cylinder 50*ad*. Therefore, when the cylinders are made of the same superconductor material, there must be sufficient spacing between the two cylinders to ensure that this field is ineffective to drive the outer cylinder from a superconductive to a normal state. Since there is no field produced within the outer cylinder 50*ad* when current signals are applied to this cylinder, there is no danger of these signals affecting the state of inner cylinder 50*bd*. The necessity of providing this spacing between the cylinders may be obviated by making the outer cylinder 50*ad* of a "hard" superconductor material and the inner cylinder of a "soft" superconductor material. The terms "hard" and "soft" superconductors are relative, the term "hard" being applied to a material which has a much higher critical field Hc at a particular operating temperature than another or "soft" superconducting material. When such an arrangement is utilized, a current signal can be applied to inner cylinder 50*bd* to cause the critical field for the "soft" superconductor material of that cylinder to be exceeded without affecting the state of the "hard" superconductor material of the outer cylinder 50*ad*. The more intense magnetic field necessary to exceed the critical field for the "hard" superconductor material of the outer cylinder can also be produced without affecting the state of the inner cylinder since there is no field produced within the outer cylinder by longitudinal currents along the cylinder.

A further embodiment of the invention is shown in FIG. 5. The structure of the circuit of this figure is similar to that of FIG. 4A, there being two superconductive cylinders 60 and 61 arranged concentrically with a rod or core 62. An outer coil 64 is wound around the outer one of the cylinders 60 and an inner coil 66 around core 62. A third coil 67 is provided which is wound between cylinders 60 and 61. Gating or control signals are applied to inner cylinder 61 by a source 70 under control of a switch 68 and to outer cylinder 60 by a source 74 under control of a switch 72. FIGS. 6A, 6B, and 6C schematically illustrate some of the switching functions which can be performed with the magnetic switching circuit of FIG. 5. The inputs and outputs of the circuit are applied and manifested at the terminals 64*a*, 66*a*, and 67*a*, which are respectively connected to windings 64, 66, and 67, the other terminals 64*b*, 66*b*, and 67*b* of these windings being grounded as indicated in FIG. 5. FIG. 6A shows a switching circuit wherein inputs are applied at terminal 67*a* and thus to intermediate winding 67 and outputs are developed either at terminal 64*a* and/or 66*a*, according to which of the switches 68 and 72 are operated. When switch 68 is operated, inner cylinder 61 is driven resistive and it is, therefore, possible to induce outputs in inner winding 66. Similarly, when switch 72 is operated, outer cylinder 60 is driven resistive so that output signals are developed on outer winding 64 in response to inputs applied to intermediate winding 67. When neither switch is operated, there is, of course, complete shielding and when both switches are operated outputs are developed on both of the coils 64 and 66 and, thus, manifested at terminals 64*a* and 66*a*. The arrangement of the inner and outer cylinders is similar to that described above with reference to FIG. 4A with the spacing between cylinders 60 and 61 and/or the superconductive material of which these cylinders are made being such that the field established by currents flowing along inner cylinder 61 do not affect the state, superconductive or normal, of the outer cylinder 60.

FIG. 6B shows a second switching function which can be performed with the circuit of FIG. 5. Here, the inputs are applied to outer coil 64 at terminal 64*a*. An output is induced in intermediate coil 67 and manifested at terminal 67*a* when switch 72 is operated to drive outer cylinder 60 normal. Outputs are developed on both the inner winding 66 and intermediate winding 67 in response to inputs applied to outer winding 64, when both of the cylinders 60 and 61 are driven resistive by operating both of the switches 68 and 72. When only switch 68 is operated, outer cylinder 60 remains superconductive and no outputs are produced when inputs are applied to winding 64. As in the above embodiments of FIG. 4A and 6A, the arrangement is such that operation of switch 68 to cause current flow through inner cylinder 61 and thereby produce a field which drives the cylinder resistive does not affect the state of outer cylinder 60. Thus, in this switching circuit, switch 72 must be operated before any outputs can be produced in response to inputs applied to winding 64. When only this switch is operated, an output is produced only on winding 67. Further, an output is produced in inner winding 66 only when switch 72 is operated together with switch 68, in which case an output is also produced on intermediate winding 67.

FIG. 6C illustrates another switching function which may be performed with the inventive structure schematically shown in FIG. 5. This switching function is realized by arranging the structure so that the field produced by current flow in inner cylinder 61, when switch 68 is operated, is effective to drive not only this cylinder but also outer cylinder 60 resistive. This may be accomplished by arranging the concentric cylinders in relatively close space relationship; and/or using a source 70 which applies a relatively large current signal to cylinder 61 when switch 68 is operated, and/or making the outer cylinder 60 of a superconductor material which is "soft" relative to the superconductor material of cylinder 61. Since current flow along cylinder 60 does not produce any magnetic field within the cylinder, the operation of switch 72 does not affect the state of the inner cylinder 61. In this switching circuit, as is illustrated in FIG. 6C, inputs are applied at terminal 67*a* to intermediate winding 67. When switch 68 is operated, a magnetic field is produced by the resulting current in inner cylinder 61 which drives both this cylinder and the outer cylinder 60 resistive so that outputs may be produced on both the outer coil 64 and inner coil 66. When switch 72 is operated, outer cylinder 60 is driven resistive and inner cylinder 61 remains superconductive so that inputs applied to winding 67 induce outputs only in the outer winding 64.

FIG. 6 is a cross sectional view showing in more detail the manner in which the switching circuit of FIG. 5 may be constructed to perform the switching function depicted in FIG. 6A. The structure comprises a series of layers of superconductor and magnetic material arranged concentrically around the center core of rod 62. The first such layer is the inner cylinder 61 which is made of superconductor material and is spaced from core 62. The space between core 62 and cylinder 61 is designated 66*s* and it is in this space that the inner winding 66 around core 62 is arranged. A layer 80 of magnetic material is provided around cylinder 61 separating this cylinder from the intermediate winding 67 which is arranged in the space 67*s* between magnetic layer 80 and a further layer of magnetic material 82. The outer coil 64 (see FIG. 5) is wound around the outer superconductor cylinder 60 and this coil is thus separated from intermediate coil 67, in space 67_s_, by the cylinder 60 and the ferromagnetic layer 82.

The space 66_s_ is extremely small, being sufficient to allow for winding 66, so that the diameter of the solenoid formed by this winding is essentially the same as the inner diameter of cylinder 61, and this cylinder is, therefore, effective when in a superconductive state to prevent an output from being induced in inner winding 66 when an input is applied to winding 67 regardless of the state, superconductive or normal, of outer cylinder 60. When an input signal is applied to coil 67 with the outer cylinder 60 in a superconductive state and the inner cylinder 61 in a normal state, there cannot, of course, be any net change in the flux threading the outer superconductive loop. However, the magnetic layer 82 provides a return path for at least a portion of the flux produced within the input coil 67 so that the net flux linking inner coil 61 may be changed while the net flux within the outer cylinder 60 remains unchanged. Similarly, when inner cylinder 61 is superconductive and outer cylinder 60 resistive, the net flux within the inner cylinder 61 remains unchanged when an input is applied to coil 67 but there is a net change of flux produced in the portion of the structure between cylinder 61 and the outer coil wound on cylinder 60 which causes an output signal to be induced on the outer coil.

FIG. 7 is a schematic representation of a binary half adder constructed in accordance with the principles of the invention employing the magnetic switching circuits of FIGS. 2 and 3. The block diagram representation of the structure of FIG. 2 is shown in FIG. 2A and a similar representation of the structure of FIG. 3 is shown in FIG. 3A and these representations are used in the diagrammatic showing of the circuit of FIG. 7. In the circuit of FIG. 7, one magnetic switch 3_a_ of the type shown in FIG. 3 and four of the magnetic switches 2_a_, 2_b_, 2_c_, and 2_d_ of the type shown in FIG. 2 are employed. The inputs to the circuit are applied by four pulse sources X0, X1, Y0, Y1, the first two sources applying pulses representative of zero and one values, respectively, for one of the binary factors to be added, and the latter two applying pulses representative of zero and one values for the other of the binary factors to be added. A carry output for the circuit is developed at a carry terminal C when sources X1 and Y1 coincidently apply inputs and a sum output is developed at a sum terminal S when either sources X1 and Y0, or X0 and Y1 apply inputs to the circuit. Actually, the outputs are not produced directly by the inputs but are produced in response to a clock pulse supplied by a source 90 after the various magnetic switches have been conditioned by the X and Y factor inputs. Thus, for example, consider the operation when X and Y inputs of 1 are applied to the circuit in the form of pulses supplied by sources X1 and Y1, respectively. Source X1 is connected to terminal 30_a_ of switch 3_a_ so that, when a pulse is applied by this source, the superconductor cylinder separating the outer input winding from the pair of inner output windings for this switch is driven resistive. Similarly, the pulse supplied by the source Y1 is effective to drive the superconductor cylinders of switch units 2_b_ and 2_d_ resistive. While the input pulses are being maintained so that switches 3_a_, 2_b_, and 2_d_ are open, a pulse is applied by source 90 to the outer input windings of switches 3_a_ and 2_a_. Since the cylinder of the latter switch is superconductive, no output is produced on its inner output winding. However, since switch 3_a_ is open, outputs are produced on both of the output coils and thus at terminals 36_a_ and 37_a_. These terminals are coupled to the outer input coils of switches 2_b_ and 2_c_ so that the outputs of switch 3_a_ are applied individually as inputs to switches 2_b_ and 2_c_. Since switch 2_b_ is open, a carry output is produced at the carry terminal C which is connected to the output terminal of this switch. No sum output is produced at terminal S for this combination of inputs since gate 2_c_ which is under control of source Y0 is closed and, though gate 2_d_ is open due to the presence of the pulse applied by source Y1, no input is applied to the outer coil of this switch.

The operation is similar for the other three possible combinations of X and Y inputs. For example, when an X input of zero and a Y input of 1 are applied, gates 2_b_, 2_d_, and 2_a_ are open so that the pulse applied by source 90 produces an output terminal 16_b_ of switch 2_a_. This output is applied as an input to gate 2_d_ thereby producing a signal on the output terminal of this switch which terminal is in turn connected to sum terminal S. Though gate 2_b_ is also open at this time due to the presence of the pulse applied by source Y1, no input is applied to this gate and, thus, no carry output is produced. When an X input of one and a Y input of zero are applied, gates 3_a_ and 2_c_ are open so that the clock pulse produces only a sum output at terminal S. When both inputs are zero and gates 2_a_ and 2_c_ are open, neither a sum nor carry output is produced.

Figure 5A:
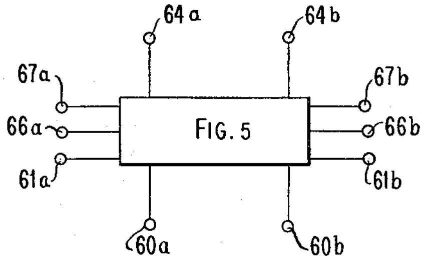
FIG. 5A is a block diagram representation of the switch of FIG. 5.

FIG. 8 is a diagrammatic showing of a matrix switch which employs as switching elements the structure of FIGS. 5 and 6 when operated to perform the switching function depicted in FIG. 6A. The block diagram representation of this structure which is shown in FIG. 5A is employed in the circuit diagram of FIG. 8. The function of the circuit of FIG. 8 is to selectively gate or switch an input applied by a source 100 to one of four output terminals 104, 106, 108, or 110. The control inputs to the circuit are applied by a pair of sources designated A and B under control of a pair of switches 112A and 112B.

The "1" terminal of switch 112A is connected to the terminal 61_a_ of the inner superconductor cylinder of unit 5_a_ and the "0" terminal of the switch is connected to the outer cylinder terminal 60_a_ so that when control switch 112A is in the "1" condition, the inner cylinder of unit 5_a_ is in a normal or resistive state and when this switch is in the "0" condition, the outer cylinder of unit 5_a_ is in a normal or resistive state. Similarly, when switch 112B is in the "1" condition, the inner cylinder of units 5_b_ and 5_c_ are resistive and, when this switch is in the "0" condition, the outer cylinders of these units are resistive. The outer coil terminal 64_b_ and the inner coil terminal 66_b_ of unit 5_a_ are connected, respectively, to the terminals of the intermediate coils of units 5_b_ and 5_c_ so that the outputs of unit 5_a_ are applied as inputs to one or the other of units 5_b_ and 5_c_ according to the condition of switch 112A. The latter two units under control of switch 112B gate these inputs to one of the output terminals 104, 106, 108, 110. Thus, for example, when both of the switches 112A and 112B are in the "1" condition, a signal applied by source 100 is gated by the matrix switch to output terminal 110. The input signal supplied by source 100 is gated to output terminal 108 when switch 112A is in the "1" condition and switch 112B in the "0" condition. When switch 112A is in the "0" condition the outputs of unit 5_a_ are applied as inputs to unit 5_b_ so that an output is then produced at terminal 104 when switch 112B is also in the "0" condition, and at terminal 106 when switch 112B is in the "1" condition.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a circuit for controlling the transmission of signals between first and second coil conductors, a cylindrical shield of superconductor material maintained at a temperature at which the material is superconductive in the absence of a magnetic field, both said coil conductors being arranged to extend longitudinally in the same direction as said cylinder with said first coil conductor being arranged around said cylindrical shield and said second coil conductor being arranged within said cylindrical shield, and conductor means connected directly to said shield for applying thereto a current signal effective to cause at least a portion thereof to be driven from a superconductive to a resistive state.

2. A gating circuit comprising first and second concentric coil conductors separated by a cylindrical shield of superconductor material, said superconductor material being maintained at a temperature at which it is superconductive in the absence of a magnetic field; and means for controlling the state, superconductive or normal, of said shield comprising means for producing current in said cylinder in a direction parallel to the axis of said coil conductors.

3. In a gating circuit, a plurality of superconductor cylinders of different radii arranged around each other, said superconductor cylinders being maintained at a temperature at which each is superconductive in the absence of a magnetic field, input and output conductors for said circuit separated from each other by at least one of said cylinders, and signal means coupled to said cylinders for selectively controlling the state, superconductive or normal, of said cylinders.

4. In a gating circuit, first and second superconductor cylinders of different diameters arranged concentrically around a common axis, said superconductor cylinders being maintained at a temperature at which each is superconductive in the absence of a magnetic field, input and output coil conductors for said circuit, each of said coils being coaxial with said cylinders, one of said coils being arranged within the inner one of said cylinders, a second one of said coils being arranged between said cylinders, a third one of said coils being arranged to encompass the outer one of said cylinders, first control means coupled to said first cylinder for controlling the state, superconductive or normal, of said first cylinder, and second control means coupled to said second cylinder for controlling the state, superconductive or normal, of said second cylinder.

5. In a gating circuit, a first superconductor cylinder, a second superconductor cylinder having a smaller diameter than said first cylinder and arranged within said first cylinder extending longitudinally in the same direction as said first cylinder, at least one input coil and at least one output coil for said circuit each extending longitudinally in the same direction as said cylinders, each said input coil being separated from each said output coil by at least one of said cylinders with that cylinder being effective when in a superconductive state to serve as a magnetic shield between the input and output coil it separates, said cylinders being maintained at a temperature at which each is superconductive in the absence of a magnetic field, and means coupled to said cylinders for selectively controlling the state, superconductive or normal, of said cylinders.

6. The circuit of claim 4 wherein said first cylinder is capable of remaining in a superconductive state at said temperature when subjected to a magnetic field in intensity sufficient to cause said second cylinder to become normal at said temperature.

7. The circuit of claim 4 wherein said input coil is arranged to embrace said first cylinder and said output coil is arranged within said second cylinder.

8. The circuit of claim 4 wherein said input coil is arranged between said first and second cylinders and one output coil is arranged within said second cylinder and another output coil it arranged to encompass said first cylinder.

9. The circuit of claim 4 wherein said first and second control means are connected directly to said first and second cylinders, respectively, and each said control means is controllable to be effective to cause sufficient current to flow longitudinally in the connected cylinder to cause that cylinder to become normal, said current flow in either cylinder being ineffective to change the state of the other cylinder.

10. In a gating circuit, a plurality of spaced concentric cylindrical layers of superconductor material, an input and an output conductor for said circuit separated from each other by at least one of said superconductor layers, each said superconductor layer separating said input and output conductors being individually effective when in a superconductive state to serve as a magnetic shield for preventing input signals applied to said input conductor from being effective to cause output signals to be induced in said output conductor, said successive layers of superconductor material being maintained at a temperature at which each is superconductive in the absence of a magnetic field, and means for controlling the state, superconductive or normal, of each said layer separating said input and output conductors comprising controllable current supply means connected directly to at least one of said layers for causing current to flow longitudinally in said layer.

11. In a gating circuit, a plurality of spaced essentially concentric cylindrical layers of superconductor material, at least one input and at least one output coil for said circuit, each of said coils being arranged to extend longitudinally in the same direction as said cylindrical layers and each said coil being separated from each of the other of said coils by at least one of said layers of superconductor material, each said superconductor layer separating one of said coils from another of said layers being individually effective to serve as a magnetic shield between the coils it separates, and means associated with said layers of superconductor material for controlling the state, superconductive or normal, of said layers separating said coils by selectively causing current to flow longitudinally in at least one of said layers.

12. In a circuit for controlling the transmission of signals between first and second conductors, first and second individual bodies interposed between said first and second conductors, each of said bodies comprising superconductor material and each being individually effective when in a superconductive state to serve as a magnetic shield for preventing input signals applied to one of said conductors from being effective to induce output signals in the other of said conductors, said bodies comprising superconductor material maintained at a temperature at which the material in each is in a superconductive state in the absence of a magnetic field, and first and second means for controlling the state, superconductive or normal, of said first and second bodies, respectively.

13. In a circuit for controlling the transmission of signals between first and second conductors, first and second individual bodies interposed between said conductors, each of said bodies comprising superconductor material and each being individually effective when in a superconductive state to serve as a magnetic shield for preventing input signals applied to one of said conductors from being effective to induce output signals in the other of said conductors, said bodies comprising superconductor material being maintained at a temperature at which the material in each is in a superconductive state in the absence of a magnetic field, and first and second controllable current supply means connected to said first and second bodies, respectively, each of said means being individually effective when controlled to supply sufficient current to the connected body to cause that body to undergo a transition to a normal state.

14. The circuit of claim 13 wherein each of said current supply means is effective when controlled to cause only the one of said bodies to which it supplies current to undergo a transition to a normal state.

15. In a circuit for controlling the transmission of signals between first and second coil conductors in accordance with the AND logical function, first and second cylindrical shields of superconductor material each maintained at a temperature at which it is superconductive in the absence of a magnetic field, said first and second shields being interposed between said first and second coil conductors and each being individually effective when in a superconductive state to serve as a magnetic shield for preventing input signals applied to one of said coil conductors from causing output signals to be induced in the other of said coil conductors, and first and second individual control means for controlling the state, superconductive or normal, of said first and second cylinders, respectively.

16. The circuit of claim 15 wherein said first and second control means comprise first and second conductors connected directly to said first and second shields, respectively.

17. In a circuit for controlling the transmission of signals between first and second coil conductors in accordance with the AND logical function, first and second coaxial cylindrical shields of superconductor material each maintained at a temperature at which it is superconductive in the absence of a magnetic field, said coil conductors being coaxial with said cylinders and arranged so that each cylinder is individually effective when in a superconductive state to serve as a magnetic shield for preventing input signals applied to one of said coil conductors from causing output signals to be induced in the other of said coil conductors, first means including conductor means connected directly to said first cylinder for selectively causing current to flow longitudinally in said first cylinder to thereby drive said first cylinder from a superconductive to a normal state, and second means including conductor means connected directly to said second cylinder for selectively causing current to flow longitudinally in said second cylinder to thereby drive said second cylinder from a superconductive to a normal state.

18. In a circuit for controlling the transmission of signals from magnetic field producing means to an output conductor, a body of superconductor material interposed between said magnetic field producing means and said output conductor for shielding said conductor from said magnetic field producing means, said superconductor material being maintained at a temperature at which the material is in a superconductive state in the absence of a magnetic field, and circuit means electrically connected directly to said body for applying a control signal thereto, said control signal being effective to produce sufficient current in said body of superconductor material to cause at least a portion of said superconductor material to be driven from a superconductive to a resistive state.

19. The circuit as set forth in claim 18 wherein said magnetic field producing means includes an electrical circuit having energizing means for producing a magnetic field, whereby the transmission of signals between said magnetic field producing means and said output conductor is controlled by said control signals applied to said body.

20. The circuit as set forth in claim 18 wherein said body of superconductor material is located physically between said magnetic field producing means and said output conductor.

References Cited in the file of this patent

UNITED STATES PATENTS

| | | |
|---|---|---|
| 2,832,987 | Buck | Apr. 29, 1958 |
| 2,914,735 | Young | Nov. 24, 1959 |
| 2,914,736 | Young | Nov. 24, 1959 |
| 2,935,694 | Schmitt et al. | May 3, 1960 |

OTHER REFERENCES

Proc. of the Eastern Joint Computer Conference I.R.E., Dec. 12, 1956, "A Crytron Catalog Memory System, Slade et al. (pp. 115–120).